_United States Patent Office_  3,365,965
Patented Jan. 30, 1968

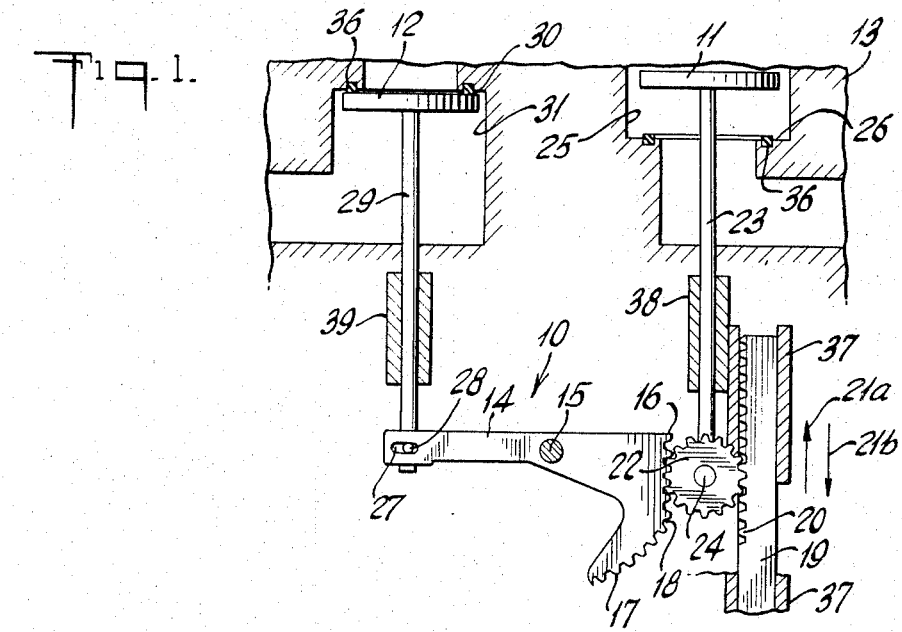
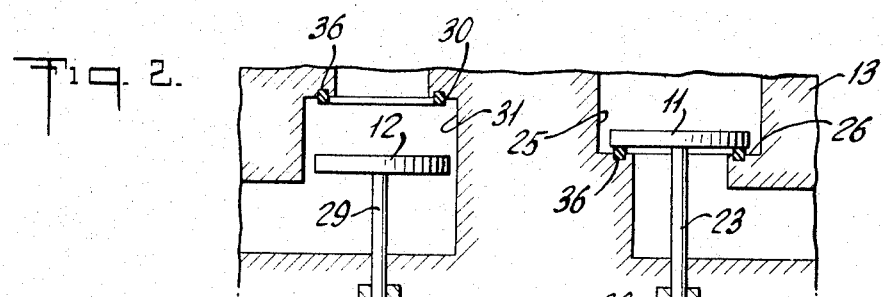
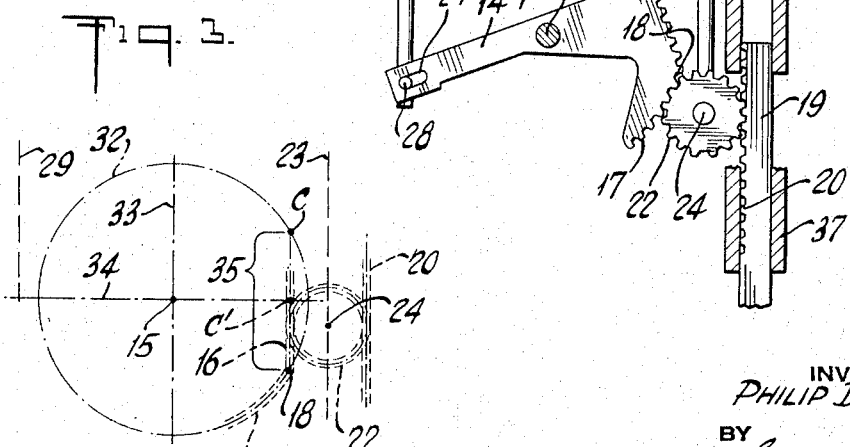

---

3,365,965
INTERLOCK MEANS FOR PROVIDING SEQUENTIAL OUTPUTS
Philip D. French, East Granby, Conn., assignor to United Aircraft Corporation, East Hartford, Conn., a corporation of Delaware
Filed Aug. 16, 1966, Ser. No. 572,764
10 Claims. (Cl. 74—110)

This invention relates to an interlock mechanism for providing sequentially two outputs in response to reciprocating input signals, and in particular, to a valve system wherein two valves are operated sequentially in response to the opposite sense of an alternating input.

It is the principal object of the invention to provide a relatively simple, fool-proof and reliable mechanical interlock system for supplying sequentially two outputs in response to an alternating input signal, in particular, wherein the input signals are the opposite phases of an alternating input signal.

It is a further object of the invention to provide an interlock mechanism as contemplated herein for regulating sequential operation of a valve system, in particular, wherein each valve of a pair of valves is moved sequentially from respective seated positions to respective open positions such that each valve of said pair withdraws from its seated position only after the other valve of the pair is seated in its position.

It is a further object of the invention to provide an interlock mechanism as contemplated herein wherein drag forces on said valves do not interfere with the programed sequence of the aforesaid valve operation, and in particular, wherein the force required to overcome such drag coincides with the normal operation of the interlock mechanism so as to eliminate the need for extraneous compensating mechanisms for overcoming such drag; essentially the invention contemplates an interlock mechanism wherein drag forces tending to retard normal valve operation merely requires a slight increase in input force amplitude and no other additional compensation network operation or structures to overcome drag.

Further objects and advantages will become apparent from the following description of the invention taken in conjunction with the figures, in which:

FIG. 1 illustrates schematically an elevational view of an interlock system in accordance with the invention for regulating operation of a pair of valves;

FIG. 2 illustrates schematically the status of said system at another phase of operation; and FIG. 3 illustrates schematically how an element of the interlock mechanism is defined and generated from a geometric consideration.

Reference is made to the figures for an embodiment of an interlock mechanism 10 incorporating the principles of the invention for regulating sequential operation of a pair of valve pistons 11, 12. As seen hereinafter pistons 11, 12 are controlled by interlock system 10 so that each piston travels from a correlated extended position to a correlated seated position and upon reaching its seated position, the other piston of said pair is removed from its seated position to its extended position.

Interlock mechanism 10 is suitably encased in a housing 13 and includes an interlock member 14 journaled for rotation about an axis 15. Member 14 has first toothed means 16 along a linear chordal segment and second toothed means along an arcuate segment 17. Chordal and arcuate segments 16, 17 are sequentially disposed in continuous fashion along a periphery of member 14 wherein, the linear segment is provided with rack teeth 16 and the arcuate segment is provided with spur gear teeth 17. The intersection of the chordal teeth and arcuate teeth define a transition 18 therebetween, that is to say, a change from rack teeth to spur gear teeth. The position of transition 18 is selected along the periphery of member 14 to correspond to the sequential operation of the valve system in a manner described hereinafter.

Interlock mechanism 10 is driven by a toothed rack 19 having rack teeth 20. Rack 19 is captivated and guided within housing 13 for reciprocating-alternating lengthwise travel depicted by arrows 21a, 21b. A spur gear 22 is pinned to a rigid rod member 23. Gear 22 is driven by rack 19 to rotate about an axis 24 in one or the other of opposite directions in response to the direction of travel of rack 19. The upper end of rod 23 carries valve piston 11 designed to reciprocate in a cylinder 25. Piston 11 is shown in FIG. 1 in open status withdrawn from its valve seat 26.

Interlocking member 14 is pinned to rotate about axis 15 and has peripheral rack teeth 16 and spur teeth 17 which teeth are engaged continually and sequentially by spur gear 22. When member 14 is aligned horizontally as shown in FIG. 1, its teeth 16 are parallel to rack teeth 20, whereby turning of spur gear 22 results in a linear translation to rod member 23. The foregoing arrangement does not impart a pivoting force to member 14, until gear 22 engages teeth 17. It will be understood that when gear 22 engages the linear rack teeth 16, regardless of the direction of turning of said spur gear 22, interlock member 14 remains stationary in horizontal alignment. When spur gear 22 engages spur teeth 17, regardless of the direction of spur gear turning, interlock member 14 functions as a spur gear and will turn in one or the other of opposite directions about axis 15 in response to the direction of turning of gear 22. An arcuate slot 27 receives and captivates a pin 28 for relative movement therein. Pin 28 is an integral extension of a second rod member 29 the upper end of which supports valve piston 12 shown seated in its valve seat 30. Piston 12 reciprocates in its cylinder 31. The slot-pin linkage 27, 28 serves to couple mechanically valve piston 12 and its driving means, i.e., interlock member 14. Said slot-pin structure provides the required mechanical clearance to allow for relative motion and displacement between member 14 and the linked structure including rod 29 and piston 12 thereon. For the purpose of this description, it will be understood that the limit stops for each valve piston 11, 12 are their respective valve seats 26, 30.

Before discussing the operation of the foregoing device, reference is made to FIG. 3 which shows a circle 32 having vertical and horizontal diameters 33, 34 and a chord 35 drawn perpendicular to horizontal diameter 34. In FIG. 3, chord 35 extends from point C to point 18. Consider the quarter sector of circle 32 containing the lower segment of chord 35, that is to say, from the intersection with horizontal diameter 34 to point 18. The geometry of rack teeth 16 and spur gear teeth 17 and such that these adjacent and sequentially disposed toothed segments are contained within a lower quarter section of a circle 32 as depicted in FIG. 3. The common junction or intersection of the toothed segments 16, 17 defined the transition 18 from spur teeth 16 to rack teeth 17 along a peripherial edge of member 14.

The invention contemplates geometry wherein the entire toothed segments 16, 17 lie within a single quarter section of a circle; thus, transition 18 falls within the confines of such quarter section. For example, in FIG. 3, the active segment 16 extends between point C' (the intersection of diameter 34 and chord 35) and point 18; whereas the active segment of spur teeth 17 extends between point 18 and lies along the circumferential periphery of the circle, but not beyond the intersection with the vertical diameter 33. If point 18 is selected to lie closer to the horizontal diameter 34, the linear length of rack teeth 16 becomes relatively short. Conversely, if point 18 is selected to lie closer to the vertical diameter 33, the circumferential length of spur teeth 17 becomes shorter.

The invention also contemplates the following coinciding relationship. The location of transition 18 is selected along the periphery of the circular quarter sector whereby gear 22 arrives at transition 18 at the same time that the traveling one of such pistons arrives at its limit stop seat. In other words, each time spur gear 22 reaches transition 18, regardless of its direction of turning, the "open" valve piston arrives at this seated position, and soon thereafter, as spur gear 22 proceeds in its travel beyond point 18, the other valve piston of the pair then lifts from its seat and is caused to travel toward its extended position.

Essentially the interlock mechanism operation is as follows: Assume the status of mechanism 10 as that depicted in FIG. 1. Piston 12 is seated and piston 11 is in its extended position withdrawn from its limit stop seat 26. Rack 19 is in its upper position. Spur gear 22 is engaging rack teeth 16, and interlock member 14 is in stationary and in horizontally aligned status. The axis 15 is midway between the vertical center lines of rods 23, 29. Rack 19 is actuated for downward travel. It will be recalled that rack 19 is guided and captivated only for up and down lengthwise travel, that the interrelated structure contemplates up and down linear travel for piston 11 and its support rod 23 with gear 22 pinned to the latter, and furthermore that the interrelated structure contemplates parallelism between rack teeth 16 and rack teeth 20 because member 14 is horizontally aligned. Hence, it will be understood that during all intervals when spur gear 22 engages segment teeth 16, the interrelationship of forces on interlock member 14 is such that member 14 does not pivot about its axis 15, but remains stationary in horizontal alignment as shown in FIG. 1.

Accordingly downward travel of rack 19 causes clockwise turning of gear 22, and since there is parallelism between teeth 16 and teeth 20, gear 22 "walks down" teeth 16 thereby carrying rod 23 therewith and ultimately to seat piston 11 in seat 26. When gear 22 reaches transition 18, piston 11 engages its seat as contemplated by the selected location of transition 18. In application, the valve pistons may include cushioning means such as piston rings 36 to insure coincidence between each valve reaching its seated position as spur gear 22 reaches transition 18.

Returning now to the description of operation, further linear travel of the seated piston 11 is not possible; such travel is prevented by the physical structure of its seat. However rack 19 continues downward travel which causes gear 22 to engage segment teeth 17 and converts interlock member 14 to function as a spur gear turning counter-clockwise about axis 15. This is caused by clockwise turning of gear 22 which drives member 14 as a gear. The action now causes the left side of member 14 to travel downwardly away from the horizontal thus withdrawing valve 12 from its limit stop seat 30. Such action continues until rack 19 ceases downward travel, whereby the status of the valves are shown in FIG. 2.

The next phase of input signal contemplates upward travel of rack 19 to return same to its FIG. 1 position. Such action causes gear 22 to turn counter-clockwise, but without imparting linear travel to rod 23. As the turning gear 22 engages teeth 17, interlock member 14 again responds as a spur gear and thus pivots clockwise about axis 15. Rod member 29 lifts to return its piston 12 to its seated position. The reaction is such that turning is taken up by member 14, whereas rod 23 remains stationary. Such action continues until gear 22 reaches transition 18 as interlock member 14 reaches its horizontal alignment thereby establishing parallelism between its teeth 16 and rack teeth 20. At such moment, valve 12 has arrived at its limit stop seat 30. Further turning of gear 22, now engaging segment 16, no longer results in turning of member 14.

As rack 19 continues its upward travel, gear 22 continues counterclockwise rotation. However, the foregoing action captivates member 14 in horizontally aligned status by reason of the forces acting on same, whereby the reaction converts into vertical upward translation of rod 23 carrying piston 11 therewith as the turning gear 22 "walks up" teeth 16. After gear 22 traverses transition 18, piston 11 begins to withdraw from its seated position and continues upward travel until the status of FIG. 1 is again reached.

Interlocking mechinism 10 intrinsically compensates against drag forces regardless of the reasons of their occurrence. When a drag force appears in the system, interlock mechanism 10 automatically develops backlash between spur gear 22 against interlock member 14; after the backlash is taken up, a wedging action is exerted by gear 22 with respect to interlock member 14 in a direction to continue positively the programed sequence of mechanism 10 as described hereinbefore. The wedging action comes into play for both rod members 23, 29 whereby each rod 23, 29 depending upon the phase of interlock mechanism operation, continues normal sequenced operation without any interference.

For example, in FIG. 1, with downward travel of rack 19, a drag on piston 11 is the equivalent of tying "an opposing spring" between piston 11 and the upper end of its cylinder 25 so as to resist downward travel of piston 11. This drag is overpowered merely by an additional compensating downward pull on rack 19 after backlash is taken up, and no correction need be applied to the stationary piston 12 during this phase of operation. After spur gear 22 traverses transition 18 a drag on piston 12 is the equivalent of "an opposing spring" between said piston and the bottom end of its cylinder 35, again requiring only a downward pull on rack 19 to compensate for same. Again it is seen that no correction is now required for stationary piston 11 during such phase of operation. During return operation, it is seen that an additional upward compensating force to rack 19 is all that is required to compensate for drag on the individual pistons, first 12 and then 11, as spur gear 22: (a) causes member 14 to turn clockwise to return same to horizontal status, (b) traverses transition 18, and (c) then "walks up" teeth 16. In all phases of drag compensation, the non-active piston is not subject to drag since it is stationary by virtue of the intrinsic operation of interlock system 10. Consequently, no extraneous compensating mechanisms or holding forces are required to maintain the stationary status of the "inactive piston," whereas the normal program of valve sequence continues as described hereinbefore. Furthermore, the drag compensating force applied to actuator 19 coincides with its normal input force.

When rack 19 travels downwardly, gear 22 is driven clockwise as it engages teeth 16. It appears that this action tends to turn interlock member 14 counterclockwise to open valve piston 12 prematurely. Such result does not occur, because both rack 19 and rod 23 are captivated only for vertical up and down travel, whereby teeth 16 are positively maintained in parallel relationship with teeth 20. Any tendency of member 14 to pivot is counteracted by the vertical captivation of rod member 23 to which gear 22 is pinned, and as reinforced by vertical captivation of actuator rack 19. Essentially, this means that after blacklash is taken up, the resultant force on interlock member 14 is not a pivoting force as gear 22 engages teeth 16. It is also preferable, as illustrated herein, to captivate member 29 only for vertical up and down travel. Guide blocks 37, 38 and 39 depict means for captivating the respective interlock elements 19, 23 and 29. As known in the art, backlash between teeth 16 and gear 22 may be taken up by suitably biasing rack 19. The foregoing interplay of forces also applies during upward travel of rack 19 as gear 22 engages teeth 16. In this instance, interlock member 14 is precluded from pivoting clockwise about its axis 15 because of the toothed parallelism mentioned hereinbefore.

To prevent imparting spurious turning forces to member 14 about its axis 15, interlock mechanism 10 is designed so that gear 22 does not engage teeth 16 above the horizontal center line passing through pivot axis 15. As a precaution, the uppermost point of engagement of teeth 16 by gear 22 is maintained below such horizontal center line.

It is intended that all matter contained in the above description or shown in the accompanying drawings shall be interpreted as illustrative and not in a limiting sense.

What is claimed is:

1. An interlock mechanism for providing sequential operation comprising, first means pinned for rotatable motion and having first engageable means along a chordal segment and second engageable means along an arcuate segment, said chordal and arcuate segments being consecutively disposed along said first means, turnable means for engaging sequentially said chordal and arcuate segments, said turnable means being pinned for rotation about a first axis, means guiding said turnable means for linear translation along a second axis, and means selectively rotating said turnable means about said first axis for causing said turnable means to undergo sequentially:
   (a) both linear translation and turning when engaging said chordal segment, and
   (b) to undergo only turning when engaging said arcuate segment,
said first means being relatively stationary during engagement of its chordal segment, and pivotal during engagement of its arcuate segment.

2. A mechanism as defined in claim 1 wherein, said segments are defined by a circle, said chordal segment lying along a chord of said circle, said arcuate segment lying along an arc of said circle, and said segments being confined within a quarter sector of said circle.

3. A mechanism as defined in claim 2 wherein, said first means being pinned at the center of said circle.

4. A mechanism as defined in claim 1 wherein, said segments are defined by a cricle and confined within a quarter sector of said circle, said first means being pinned at the center of said circle, said first axis being parallel to the axis of rotation of said first means, and said second axis being orthogonal with respect to said first axis.

5. A mechanism as defined in claim 1 further including, means cooperating with said guiding means and said turnable means for captivating said first means against linear translation motion.

6. A mechanism as defined in claim 1 wherein, the intersection of said segments define a transition therebetween, said first means and said turnable means each having respective members, one member being translatable from an extended position to a limit stop position and upon reaching its limit stop position, the other member being translatable from a correlated limit stop position to a correlated extended position in response to sequential turning of said turnable means, said transition between said segments substantially coinciding with said one member reaching its limit stop position.

7. A mechanism as defined in claim 6 wherein said turnable means and the member of said first means are on opposite sides of the turning axis of said first means.

8. An interlock mechanism for providing sequential operation comprising, first and second members guided for linearly translatable motion, first means pinned for rotatable motion and having first engageable means along a chordal segment and second engageable means along an arcuate segment, said chordal and arcuate segments being sequentially disposed along said first means and the intersection of said chordal and arcuate segments defining a transition therebetween, turnable means for engaging said chordal and arcuate segments sequentially and being turnably pinned to one of said members, the other of said members being coupled to said rotatable means, driving means for selectively turning said turnable means, and means cooperating with said turnable means and said driving means for captivating said first means against linear translation motion, said first means turning during engagement of its arcuate segment and being stationary during engagement of its chordal segment, said members being alternatively movable wherein each is translatable from a correlated extended position to a correlated limit stop position and upon reaching its limit stop position, the other member of said pair being translatable from its limit stop position to its extended position in response to selective turning of said turnable means, said transition between said chordal and arcuate segments substantially coinciding with a member reaching its limit stop position.

9. A mechanism as defined in claim 8 wherein, said members including respective first and second valve means and means for seating each valve means in a correlated valve seat defining the respective limit stop positions.

10. A mechanism as defined in claim 9 wherein, said turnable means comprising a spur gear journaled to said one member, said driving means including a rack guided for alternating longitudinal travel and having teeth for engaging said spur gear, said spur gear undergoes selective turning in one or the other of opposite directions in response to direction of travel of said rack, said chordal segment having rack teeth and said arcuate segment having spur teeth, said spur gear also continually and sequentially engaging the teeth of said first means and pivoting said first means while engaging the arcuate teeth thereof, whereby said first means undergoes selective turning in one or the other of opposite directions in response to the direction of turning of said spur gear, and the engagement of said spur gear with the intersection of said segment rack teeth and said segment spur teeth coinciding with each valve means reaching its seated position.

No references cited.

FRED C. MATTERN, JR., *Primary Examiner.*

F. D. SHOEMAKER, *Assistaint Examiner.*